United States Patent
Han et al.

(10) Patent No.: US 12,530,344 B2
(45) Date of Patent: Jan. 20, 2026

(54) METHOD FOR ENHANCING LEARNING DATA SET IN NATURAL LANGUAGE PROCESSING SYSTEM

(71) Applicant: POSTECH RESEARCH AND BUSINESS DEVELOPMENT FOUNDATION, Pohang-si (KR)

(72) Inventors: Wook Shin Han, Pohang-si (KR); Hyuk Kyu Kang, Pohang-si (KR); Hyeon Ji Kim, Ulsan (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/725,248

(22) PCT Filed: Dec. 30, 2021

(86) PCT No.: PCT/KR2021/020301
§ 371 (c)(1),
(2) Date: Jun. 28, 2024

(87) PCT Pub. No.: WO2023/128021
PCT Pub. Date: Jul. 6, 2023

(65) Prior Publication Data
US 2025/0061111 A1    Feb. 20, 2025

(30) Foreign Application Priority Data

Dec. 30, 2021 (KR) .......... 10-2021-0192460

(51) Int. Cl.
*G06F 16/242* (2019.01)
*G06F 16/21* (2019.01)
(52) U.S. Cl.
CPC .......... *G06F 16/242* (2019.01); *G06F 16/211* (2019.01)

(58) Field of Classification Search
CPC ...... G06F 16/242; G06F 16/211; G06F 16/21; G06F 16/22; G06F 16/2452;
(Continued)

(56) References Cited

U.S. PATENT DOCUMENTS 10,747,761 B2    8/2020    Zhoug et al.
11,205,099 B2   12/2021    Shlens et al.
(Continued)

FOREIGN PATENT DOCUMENTS

CN       112783921 A        5/2021
KR       10-2261199         6/2021
KR    10-2021-0156964      12/2021

OTHER PUBLICATIONS

International Search Report issued for corresponding International Patent Application No. PCT/KR2021/020301 on Sep. 21, 2022, along with an English Translation (5 pages).
(Continued)

*Primary Examiner* — Tyler J Torgrimson
(74) *Attorney, Agent, or Firm* — Hauptman Ham, LLP

(57) ABSTRACT

A learning data set enhancing method comprises the steps of: determining a first initial learning data set comprising a first learning-purpose natural language query, database information regarding the database, and a first learning-purpose SQL query corresponding to the first learning-purpose natural language query; generating first novel database information regarding a first novel database having a different schema from the database by applying a first schema modification operation to the database; generating a first novel learning-purpose SQL query regarding the first novel database by applying a first SQL query synchronization operation corresponding to the first schema modification operation to the first learning-purpose SQL query; and determining a first novel learning data set comprising the (Continued)

first learning-purpose natural language query, the first novel database information, and the first novel learning-purpose SQL query.

18 Claims, 9 Drawing Sheets

(58) Field of Classification Search
 CPC ............... G06F 16/2453; G06F 16/28; G06F 16/24522; G06F 16/2228; G06F 16/24534; G06F 16/284; G06N 3/04; G06N 3/08; G06N 20/00
 See application file for complete search history.

(56) References Cited

U.S. PATENT DOCUMENTS

| 2017/0185921 | A1 | 6/2017 | Zhang |
| 2021/0357409 | A1 | 11/2021 | Rodriguez et al. |
| 2023/0185799 | A1* | 6/2023 | Hoang ................... G06N 20/00 704/2 |
| 2023/0186161 | A1* | 6/2023 | Arthur ................... G06F 40/58 704/2 |

OTHER PUBLICATIONS

Written Opinion issued for corresponding International Patent Application No. PCT/KR2021/020301 on Sep. 21, 2022 (3 pages).
Florin Brad et al., "Dataset for a Neural Natural Language Interface for Databases (NNLIDB)", arXiv:1707.03172v1, Jul. 11, 2017, <https://arxiv.org/abs/1707.03172v1>, 14 pages, Cited in NPL Nos. 1 and 2.
Hyeonji Kim et al, "Natural language to SQL: Where are we today?", Jun. 1, 2020, DOI: https://doi.org/10.14778/3401960.3401970, pp. 1737-1750.
Loredana Caruccio et al., "Synchronization of Queries and Views Upon Schema Evolutions: A Survey", ACM Transactions on Database Systems, vol. 41, No. 2, Article 9, May 2016, 41 pages.

* cited by examiner

| MODIFICATION TARGET | ITEM | DESCRIPTION |
|---|---|---|
| DATABASE SCHEMA STRUCTURE | TABLE JOIN | COMBINE TWO TABLES IN UNIQUE-KEY-FOREIGN-KEY JOIN RELATIONSHIP USING KEY |
| | TABLE DECOMPOSITION | DECOMPOSE ONE TABLE INTO TWO TABLES, WHERE TWO POST-DECOMPOSITION TABLES SHARE UNIQUE KEY OF EXISTING TABLE AND ATTRIBUTES OTHER THAN UNIQUE KEY ARE SPLIT INTO TWO TABLES |
| | TABLE ADDITION | ADD NEW TABLE TO DATABASE |
| | COLUMN ADDITION | ADD NEW COLUMN TO ANY TABLE IN DATABASE |
| NAME OF DATABASE SCHEMA ELEMENT | ADDING PREFIX | ADD TABLE NAME TO COLUMN NAME AS PREFIX |
| | DELETING PREFIX | DELETE FIRST TOKEN OF COLUMN NAME |
| | ADDING DATA TYPE | ADD DATA TYPE TO COLUMN NAME AS PREFIX |
| | EXPANDING ABBREVIATION | SPELL OUT ABBREVIATION OF COLUMN/TABLE |
| | EXPANDING ACRONYM | SPELL OUT ACRONYM OF COLUMN/TABLE |
| | CHANGING TO SYNONYM | CHANGE EACH WORK OF COLUMN/TABLE NAME TO SYNONYM |

FIG.5

Algorithm 1: DATABASEAUGMENTATION

Input: Database $D$, a set of SQL queries $Q_{SQL}$ on $D$,
One of predefined database transformation rules
$f_D$
Output: Transformed database $D'$, Synchronized SQL
queries $Q'_{SQL}$
$f_{sql} \leftarrow$ GETSYNCHRONIZATIONRULE($f_D$)
$Q'_{SQL} \leftarrow \emptyset$
$D' \leftarrow f_D(D)$
foreach $q_{sql} \in Q_{SQL}$ do
$\quad Q'SQL \leftarrow Q'_{SQL} \cup f_{sql}(q_{sql}, D, D')$
return $D', Q'_{SQL}$

FIG.9

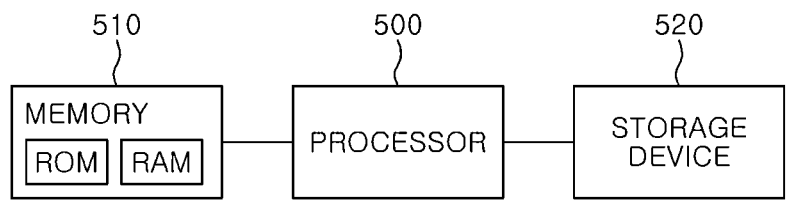

FIG.10

METHOD FOR ENHANCING LEARNING DATA SET IN NATURAL LANGUAGE PROCESSING SYSTEM

CROSS REFERENCE TO RELATED APPLICATION

This application is a National Stage of International Application No. PCT/KR2021/020301, filed on Dec. 30, 2021, which is based upon and claims the benefit of priority to Korean Patent Application No. 10-2021-0192460, filed on Dec. 30, 2021, in the Korean Intellectual Property Office. All of the aforementioned applications are hereby incorporated by reference in their entireties.

TECHNICAL FIELD

The present disclosure relates to a method of training an artificial neural network, and more particularly, to a method of augmenting training datasets required for training an artificial neural network.

BACKGROUND ART

Translating natural language queries into structured query language (SQL) queries enables people without expert knowledge to query and obtain data from a relational database and can help increase the versatility and usability of a system with the relational database. Accordingly, translating natural language queries into the SQL is attracting increasing attention in the natural language processing and database fields. In particular, active research has been being conducted on a method of translating natural language queries based on a neural network. In the case of translating a natural language query based on a neural network, a large amount of various training datasets are required for training the neural network in advance. However, in many cases, there is not enough training data that can be used for training a neural network. Collecting training datasets including complex SQL queries is a challenging problem that requires the labor of SQL experts, which may be time-consuming and expensive. To solve this problem, various training data augmentation methods have been proposed. Training data augmentation methods may be coarsely classified as template-based methods and methods employing an SQL-to-text model for translating SQL into a natural language.

According to template-based methods, synthetic data is generated using templates of predefined natural language query and SQL pairs. In the templates, reference parts for data in a database are empty slots. When a database is given, data is generated by randomly selecting data in the database and filling the slots with the selected data. According to this method, synthetic data is generated using a limited number of templates defined by humans, and thus the manual work of defining multiple templates is required for collecting various types of data. Also, it is difficult to generate sentences with natural expressions in consideration of the domain of a database. To this end, it is necessary to use limited expressions that are applicable irrespective of domains, or create a new template according to the domain of a database.

In methods employing an SQL-to-text model, a model for translating SQL into a natural language is used. First, a database corresponding to a large number of SQL queries is crawled from a web or SQL queries are automatically synthesized with predefined grammar and a given database, and then a natural language query sentence corresponding to each SQL query is generated using a model. Compared to the template-based methods, these methods have an advantage in that it is possible to generate various natural language query expressions. However, it is still difficult to collect or generate various data for training an SQL-to-text model.

DISCLOSURE

Technical Problem

As described above, existing methods of augmenting training data additionally require manually created templates or natural language training data for training another model, that is, a structured query language (SQL)-to-text model. Also, existing methods do not ensure an increase in the diversity of database schemas.

The present disclosure is intended to solve this problem and is directed to providing a training data augmentation method that does not require manually created templates but allows augmentation in various training data without addition of natural language training data.

Technical Solution

According to an aspect of the present disclosure, provided is a method of augmenting training datasets used for training a predetermined neural network in a natural language processing system including a translator for translating a natural language query into a structured query language (SQL) query based on the predetermined neural network. The method may comprise: determining a first initial training dataset including a first training natural language query, database information of a database, and a first training SQL query corresponding to the first training natural language query; generating first new database information of a first new database having a different schema than the database by applying a first schema modification operation to the database; generating a first new training SQL query for the first new database by applying a first SQL query synchronization operation corresponding to the first schema modification operation to the first training SQL query; and determining a first new training dataset including the first training natural language query, the first new database information, and the first new training SQL query.

The method may further comprise: generating second new database information of a second new database having a different schema than the database by applying a second schema modification operation to the database; generating a second new training SQL query for the second new database by applying a second SQL query synchronization operation corresponding to the second schema modification operation to the first training SQL query; and determining a second new training dataset including the first training natural language query, the second new database information, and the second new training SQL query.

The method may further comprise: determining a second initial training dataset including a second training natural language query, the database information, and a second training SQL query corresponding to the second training natural language query; generating third new database information of a third new database having a different schema than the database by applying the first schema modification operation to the database; generating a third new training SQL query for the third new database by applying the first SQL query synchronization operation to the second training SQL query; and determining a third new training dataset including the second training natural language query, the third new database information, and the third new training SQL query.

The method may further comprise: generating fourth new database information of a fourth new database having a different schema than the first new database by applying the first schema modification operation to the first new database; generating a fourth new training SQL query for the fourth new database by applying the first SQL query synchronization operation to the first new training SQL query; and determining a fourth new training dataset including the first training natural language query, the fourth new database information, and the fourth new training SQL query.

The first schema modification operation may include at least one of a first modification operation of changing a schema structure of the database or a second modification operation of changing a name of a schema element of the database.

According to another aspect of the present disclosure, provided is a method of training a predetermined neural network in a natural language processing system including a translator for translating a natural language query into a structured query language (SQL) query based on the predetermined neural network. The method may comprise: determining a first initial training dataset including a first training natural language query, database information of a database, and a first training SQL query corresponding to the first training natural language query; generating first new database information of a first new database having a different schema than the database by applying a first schema modification operation to the database; generating a first new training SQL query for the first new database by applying a first SQL query synchronization operation corresponding to the first schema modification operation to the first training SQL query; determining a first new training dataset including the first training natural language query, the first new database information, and the first new training SQL query; and training the neural network using the first new training dataset.

The method may further comprise: generating second new database information of a second new database having a different schema than the database by applying a second schema modification operation to the database; generating a second new training SQL query for the second new database by applying a second SQL query synchronization operation corresponding to the second schema modification operation to the first training SQL query; and determining a second new training dataset including the first training natural language query, the second new database information, and the second new training SQL query, wherein the training of the neural network is performed using the first and second new training datasets.

The method may further comprise: determining a second initial training dataset including a second training natural language query, the database information, and a second training SQL query corresponding to the second training natural language query; generating third new database information of a third new database having a different schema than the database by applying the first schema modification operation to the database; generating a third new training SQL query for the third new database by applying the first SQL query synchronization operation to the second training SQL query; and determining a third new training dataset including the second training natural language query, the third new database information, and the third new training SQL query, wherein the training of the neural network is performed using the first to third new training datasets.

The method may further comprise: generating fourth new database information of a fourth new database having a different schema than the first new database by applying the first schema modification operation to the first new database; generating a fourth new training SQL query for the fourth new database by applying the first SQL query synchronization operation to the first new training SQL query; and determining a fourth new training dataset including the first training natural language query, the fourth new database information, and the fourth new training SQL query, wherein the training of the neural network is performed using the first to fourth new training datasets.

According to yet another aspect of the present disclosure, provided is an information search device for providing a search result corresponding to a natural language query. The information search device may comprise: a memory configured to store program commands; and a processor connected to the memory and configured to execute the program commands stored in the memory, wherein, when the program commands are executed by the processor, the program commands cause the processor to perform the operations of: training a predetermined neural network; receiving the natural language query; translating the natural language query into a structured query language (SQL) query based on the predetermined neural network; and acquiring the search result corresponding to the natural language query using the SQL query, wherein program commands causing the processor to perform the operation of training the predetermined neural network cause the processor to perform the operations of: determining a first initial training dataset including a first training natural language query, database information of a database, and a first training SQL query corresponding to the first training natural language query; generating first new database information of a first new database having a different schema than the database by applying a first schema modification operation to the database; generating a first new training SQL query for the first new database by applying a first SQL query synchronization operation corresponding to the first schema modification operation to the first training SQL query; determining a first new training dataset including the first training natural language query, the first new database information, and the first new training SQL query; and training the neural network using the first new training dataset.

The program commands causing the processor to perform the operation of training the neural network may cause the processor to further perform the operations of: generating second new database information of a second new database having a different schema than the database by applying a second schema modification operation to the database; generating a second new training SQL query for the second new database by applying a second SQL query synchronization operation corresponding to the second schema modification operation to the first training SQL query; and determining a second new training dataset including the first training natural language query, the second new database information, and the second new training SQL query, wherein the training of the neural network is performed using the first and second new training datasets.

The program commands causing the processor to perform the operation of training the neural network may cause the processor to further perform the operations of: determining a second initial training dataset including a second training natural language query, the database information, and a second training SQL query corresponding to the second training natural language query; generating third new database information of a third new database having a different schema than the database by applying the first schema modification operation to the database; generating a third new training SQL query for the third new database by applying the first SQL query synchronization operation to the second training SQL query; and determining a third new training dataset including the second training natural language query, the third new database information, and the third new training SQL query, wherein the training of the neural network is performed using the first to third new training datasets.

The program commands causing the processor to perform the operation of training the neural network may cause the processor to further perform the operations of: generating fourth new database information of a fourth new database having a different schema than the first new database by applying the first schema modification operation to the first new database; generating a fourth new training SQL query for the fourth new database by applying the first SQL query synchronization operation to the first new training SQL query; and determining a fourth new training dataset including the first training natural language query, the fourth new database information, and the fourth new training SQL query, wherein the training of the neural network is performed using the first to fourth new training datasets.

Advantageous Effects

According to an embodiment of the present disclosure, in a natural language processing system for providing a search result in response to a natural language query based on a translator based on a neural network, it is possible to expand various training datasets required for training a neural network through database schema modification with no or a limited addition of natural language training data or in a limited situation. Accordingly, it is possible to acquire a large number of training datasets required for training a neural network of a natural language processing system, and improve accuracy of query language translation by training a neural network using the acquired training datasets.

Unlike existing training data augmentation methods, according to a training data augmentation method of the present disclosure, it is possible to increase the diversity of database schemas and automatically generate a new form of structured query language (SQL) query that does not exist in given training datasets. The method of the present disclosure can be used in training any neural network-based natural language-SQL translator and can also be used with an existing template-based augmentation method or SQL-to-text model-based augmentation method. Unlike existing technology for generating natural language queries and SQL queries within a given database schema, according to the method of the present disclosure, a database schema is modified. Therefore, it is possible to increase the diversity of database schemas in training data.

With an improvement in the accuracy of natural language-SQL translation, a user who wants to access information stored in a relational database management system (RDBMS) can query about desired information in a natural language in the form of speech or text and acquire an accurate search result without having to understand a complex table schema. Accordingly, accessibility to a database management system can be remarkably improved.

The present disclosure can be applied to any field that requires a natural language interface of a database management system. For example, the method of the present disclosure can be applied to a user interface in a cloud service and particularly useful for mobile devices or hands-free devices in a vehicle.

DESCRIPTION OF DRAWINGS

FIG. 5 is a table in which examples of schema modification operations are arranged.

FIG. 9 shows a pseudocode in which a training dataset augmentation process according to another exemplary embodiment of the present disclosure is summarized.

FIG. 10 shows an example of a physical configuration of an information search system according to an embodiment of the present disclosure.

BEST MODE OF THE DISCLOSURE

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings.

Figure 1:
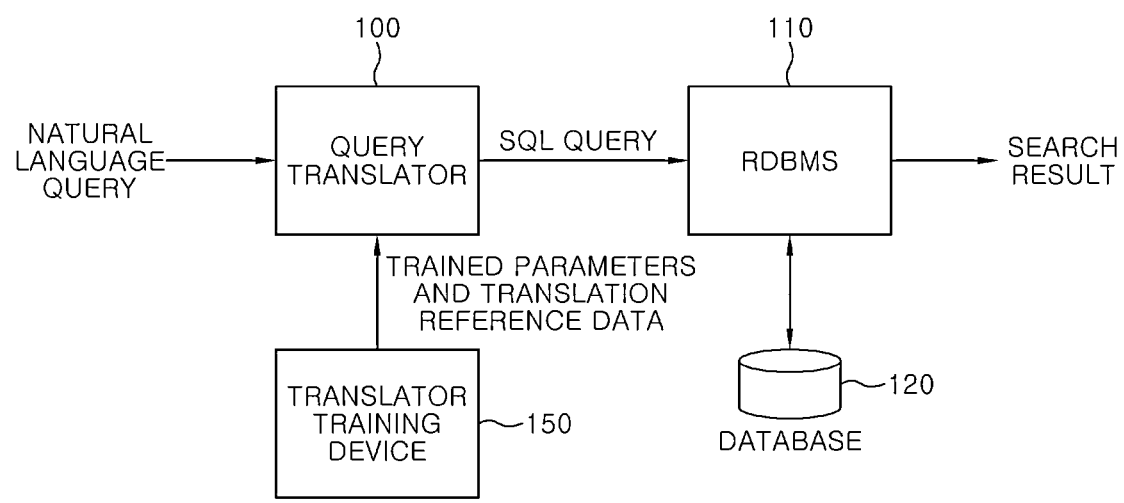
FIG. 1 is a block diagram of an information search system according to an embodiment of the present disclosure.

FIG. 1 is a block diagram of an information search system according to an embodiment of the present disclosure. The information search system receives a natural language query from a client and provides a search result corresponding to the natural language query to the client. The client may be a device, for example, a personal computer (PC), a mobile terminal such as a smartphone, an information terminal in a vehicle, or another data processing device, used by a user who can communicate in a natural language. Also, the client may be an application program running on such a device. However, in other application examples, the information search system may directly recognize the user's voice through a microphone without any external client and perform a search based on the recognition. In this case, the natural language query may be the recognized voice or natural language text which is converted from the recognized voice.

In the embodiment shown in the drawing, the information search system may include a query translator 100, a relational database management system (RDBMS) 110, and a database 120. Also, the information search system may additionally include a translator training device 150 for training the query translator 100. Although the query translator 100 and the translator training device 150 are separately shown in the drawing, this is a functional illustration, and the query translator 100 and the translator training device 150 may be integrated as one device. In other embodiments, the translator training device 150 may not be included in the information search system and may be provided outside of the information search system.

The query translator 100 may receive a natural language query and translate the natural language query into a database query that is recognizable by the RDBMS 110, for example, a structured query language (SQL) query. The query translator 100 may be built based on a neural network such as a deep neural network. The RDBMS 110 may store data in the database 120, manage the stored data, and provide an inquiry service to another application program. In particular, the RDBMS 110 may receive the SQL query, parse the SQL query, and acquire data corresponding to the SQL query from the database 120. The RDBMS 110 may provide the search result data read from the database 120 to an entity which has transmitted the natural language query.

The translator training device 150 may train the neural network constituting the query translator 100. The translator training device 150 may optimize parameters of the query translator 100 based on previously acquired training datasets and provide the trained parameters to the query translator 100. In addition to the trained parameters, the translator training device 150 may acquire translation reference data that may be referred for translation in the training process and provide the translation reference data to the query translator 100.

Figure 2:
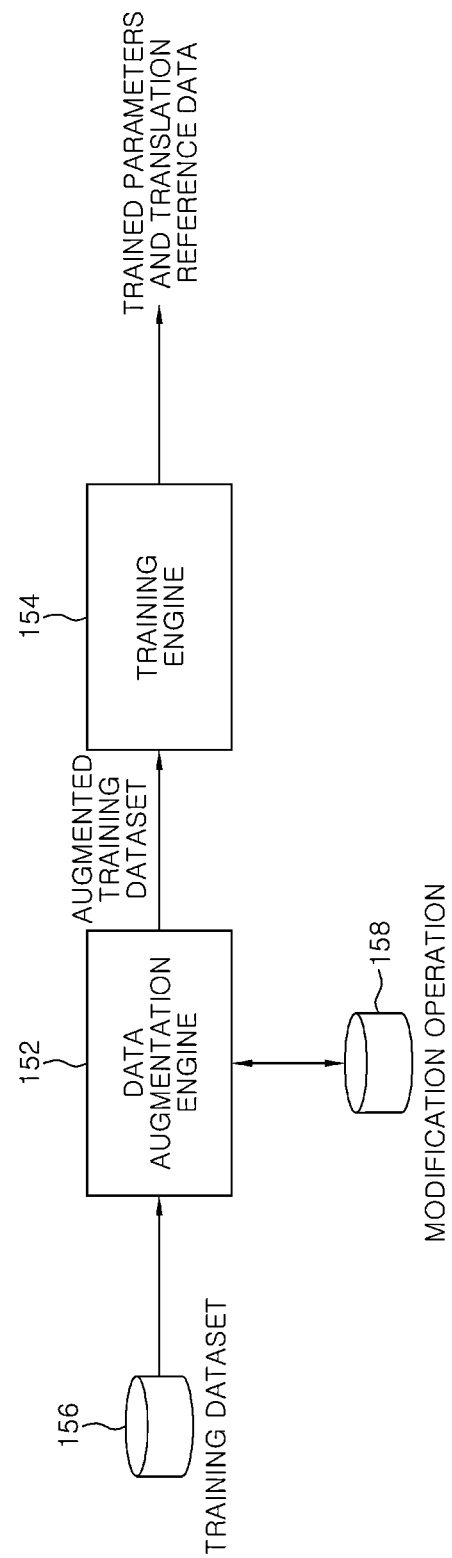
FIG. 2 is a block diagram of the translator training device 150 according to an embodiment of the present disclosure.

FIG. 2 is a block diagram of the translator training device 150 according to an embodiment of the present disclosure. In the embodiment shown in drawing, the translator training device 150 may include a data augmentation engine 152 and a training engine 154.

The data augmentation engine 152 receives training datasets and augments the training datasets to increase the number of training datasets. Accordingly, the augmented training datasets output by the data augmentation engine 152 may include not only original training datasets stored in a training dataset table 156 but also training datasets added by the data augmentation engine 152. In an exemplary embodiment, the training datasets may be sets of a natural language query, a database, and an SQL query. The natural language query and the SQL query may be stored in the training dataset table 156 along with information on the database.

The database may be the database 120 managed by the RDBMS 110. However, according to a modified embodiment, the database may be an overall or partial duplicate of the database 120 managed by the RDBMS 110. According to another embodiment, the database may merely represent schema information of the database 120 managed by the RDBMS 110. Due to the possibility of such a modification, a database included in training datasets will be referred to as "database information" in the claims appended to this specification, and will be simply referred to as "database" in this specification.

According to an exemplary embodiment of the present disclosure, the data augmentation engine 152 may not augment training data including new natural language query data but may generate new training data through a database schema modification operation. In other words, unlike an existing training data augmentation method of augmenting training data based on new natural language query data, the data augmentation engine 152 according to an exemplary embodiment of the present disclosure can automatically generate a new form of SQL query which is not in given training datasets, by increasing the diversity of database schemas. In this case, it may be assumed that only initial training datasets for natural language-SQL translation are given. Accordingly, the data augmentation engine 152 can generate new training data even when additional training data including new natural language query data is not externally supplied.

In exemplary embodiments, an augmentation operation of the data augmentation engine 152 may include a schema modification operation and an SQL synchronization operation. The schema modification operation may be performed according to a predetermined execution instruction algorithm based on the types of schema modification operations stored in a modification operation table 158. The SQL synchronization operation may be performed based on synchronization operation definition information stored in the modification operation table 158. A detailed augmentation operation will be described in detail below.

The training engine 154 may receive the augmented training datasets from the data augmentation engine 152 and train the query translator 100 or update a learning state based on the augmented training datasets. As described above, with the progression of training or after training is completed, the training engine 154 may provide trained parameters and translation reference data to the query translator 100.

Figure 3:
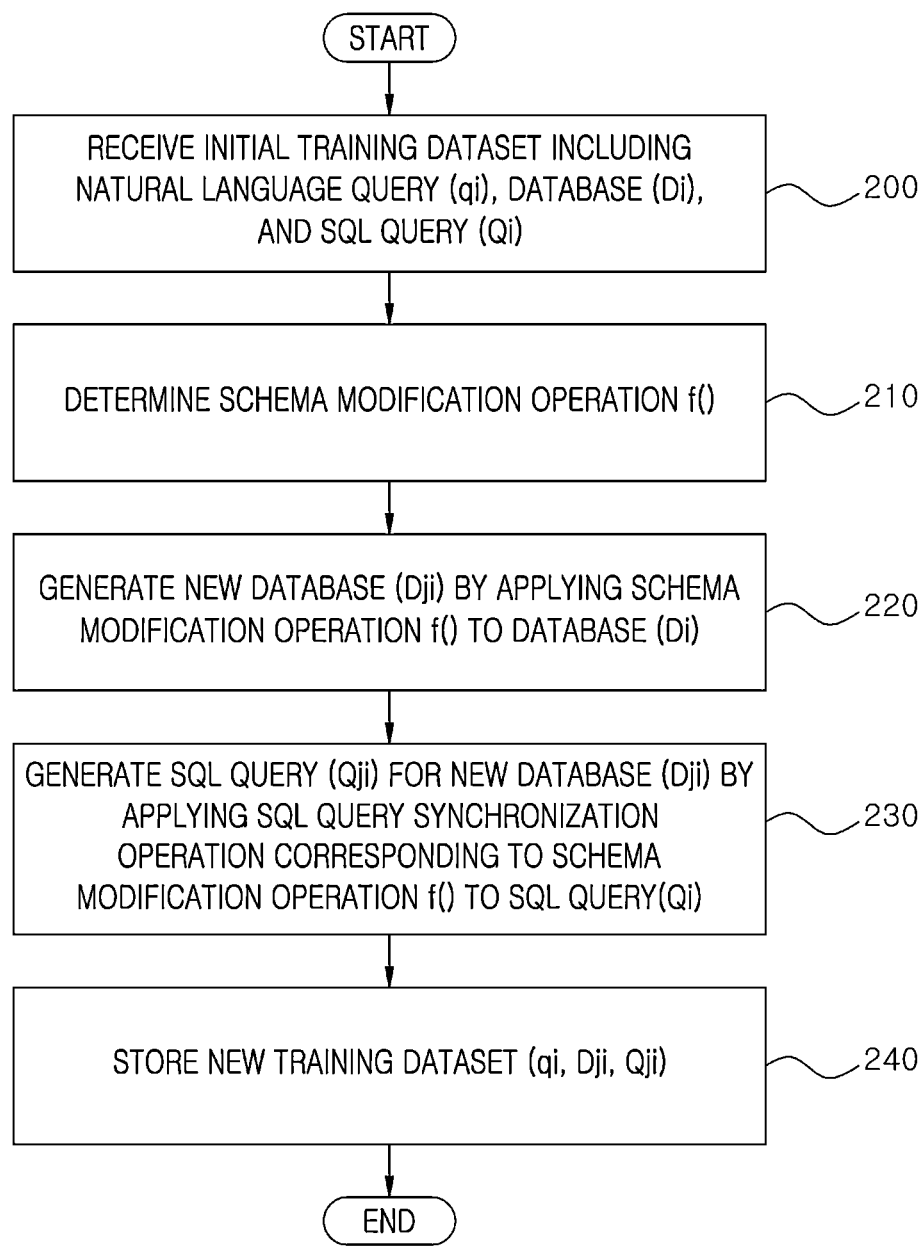
FIG. 3 is a flowchart illustrating a method of augmenting training datasets according to an embodiment of the present disclosure.
Figure 4:
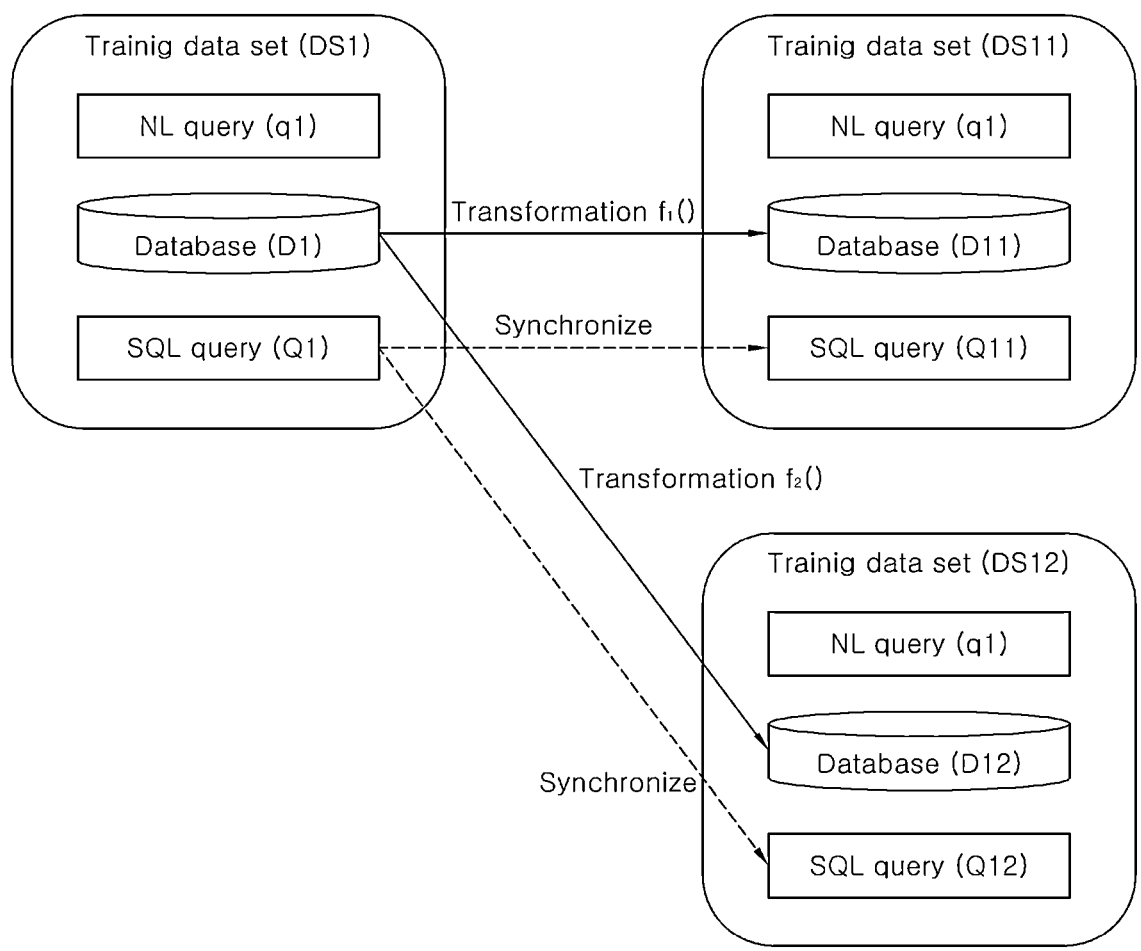
FIG. 4 is a diagram illustrating an example of a training dataset augmentation process according to an embodiment of the present disclosure.

FIG. 3 is a flowchart illustrating a method of augmenting training datasets according to an embodiment of the present disclosure. FIG. 4 is a diagram illustrating an example of a training dataset augmentation process according to an embodiment of the present disclosure.

Referring to FIGS. 3 and 4, first, the data augmentation engine 152 receives initial training datasets (operation 200). For example, as shown in FIG. 5, a first initial training dataset $DS_1$ may include a natural language query $q_1$, a database $D_1$, and an SQL query $Q_1$.

Subsequently, the data augmentation engine 152 may determine a schema modification operation $f_1(\ )$ to be applied to the database $D_1$ for data augmentation (operation 210). Then, the data augmentation engine 152 may generate a new database $D_{11}$ by applying the schema modification operation to the database $D_1$ (operation 220).

The data augmentation engine 152 may check what kind of SQL query synchronization operation corresponds to the schema modification operation $f_1(\ )$ and generate an SQL query $Q_{11}$ for the new database $D_{11}$ by applying the checked SQL query synchronization operation to the SQL query $Q_1$ (operation 230).

A new training dataset $DS_{11}$ derived through such a process includes the initial natural language query $q_1$, the new database $D_{11}$, and the new SQL query $Q_{11}$. The data augmentation engine 152 may store the new training dataset $(q_1, D_{11}, Q_{11})$ as the training dataset $DS_{11}$ added by augmentation (operation 240).

As shown in FIG. 4, such a data augmentation operation is not a one-time operation, but may be repeatedly performed for other schema modifications operations and other initial training datasets to generate new training datasets. In other words, after generating a new training dataset based on the first schema modification operation $f_1(\ )$ the data augmentation engine 152 may generate a new training dataset based on a second schema modification operation $f_2(\ )$.

The data augmentation engine 152 may determine the second schema modification operation $f_2(\ )$ to be applied to the database $D_1$ in the initial training dataset $DS_1$ (operation 210) and then generate a new database $D_{12}$ by applying the second schema modification operation $f_2(\ )$ to the database $D_1$ (operation 220). Subsequently, the data augmentation engine 152 may check what kind of SQL query synchronization operation corresponds to the second schema modification operation $f_2(\ )$ and generate an SQL query $Q_{12}$ for the new database $D_{12}$ by applying the checked SQL query synchronization operation to the SQL query $Q_1$ (operation 230). Accordingly, a new training dataset $DS_{12}$ includes the initial natural language query $q_1$, the new database $D_{12}$, and the new SQL query $Q_{12}$. The data augmentation engine 152 may store the new training dataset $(q_1, D_{12}, Q_{12})$ as the training dataset $DS_{12}$ added by augmentation (operation 240).

FIG. 5 is a table in which examples of schema modification operations are arranged. Database schema modification operations include operations for modifying a database schema structure and operations for changing the names of database schema elements.

The operations for modifying a database schema structure include operations for table join, table decomposition, table addition, and column addition. Table join may be combining two tables in a unique-key-foreign-key join relationship into one table using the keys. Table decomposition may be decomposing one table into two tables. Here, the two tables after decomposition share the unique key of the existing table, and attributes other than the unique key may be split into the two tables. Table addition may be adding a new table to a database. Column addition may be adding a new column to any table in a database.

The operations for changing the names of database schema elements include, according to renaming methods, renaming operations of adding a prefix, deleting a prefix, adding a data type, expanding an abbreviation, expanding an acronym, and changing to a synonym. Adding a prefix may be, for example, adding a table name to a column name as a prefix. Deleting a prefix may be, for example, deleting a first token of a column name such as changing "Contact-Name" to "Name." Adding a data type may be adding a data type to a column name as a prefix. Expanding an acronym may be spelling out an abbreviation in a column or table. Expanding an acronym may be spelling out an acronym in a column or table name. Changing to a synonym may be changing each word in a column or table name to a synonym.

Figure 6:
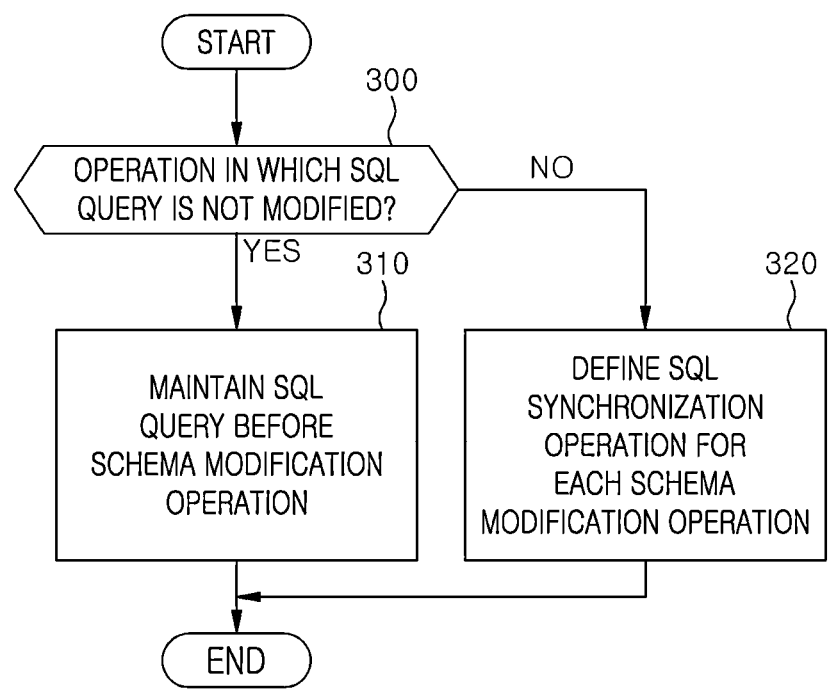
FIG. 6 is a flowchart illustrating an example of a method of determining an SQL synchronization operation according to a database schema modification operation.

FIG. 6 is a flowchart illustrating an example of a method of determining an SQL synchronization operation according to a database schema modification operation.

The illustrative database schema modification operations which are summarized in FIG. 5 may be coarsely classified as operations in which existing SQL queries are not modified and operations in which existing SQL queries may be modified. The operations in which existing SQL queries are not modified may include adding a new table or column. The operations in which existing SQL queries may be modified may include changing a database schema name, table decomposition, table join, and the like.

Referring to FIG. 6, according to an embodiment, in the case of determining an SQL synchronization operation, an SQL query before a database schema modification operation for a modified database D' may be maintained without any change for an operation in which an existing SQL query is not modified (operations 300 and 310).

Meanwhile, an SQL synchronization operation may be defined for each operation in which an existing SQL query is modified (operation 320). First, in the case of changing a database schema name, a mapping table of an existing name and a new name is generated and maintained, and a database schema reference part of the SQL query is changed to the new name. In the case of table decomposition, when the SQL query after a database schema modification operation references a pre-decomposition table T, the reference part to the pre-decomposition table T can be changed to refer to the table after joining two post-decomposition tables T1 and T2 using a unique key. In the case of table join, the SQL query may be expressed in relational algebra and then modified using an equivalence relation of relational algebra. An example of an equivalence relation may be pushing join into selection and projection operations. Subsequently, when a unique-key-foreign-key join operation is used in the SQL query expressed in relational algebra, the corresponding reference part is changed to a reference for a new table. When the SQL query refers to only one of two joined tables, the reference part is likewise changed to a reference for a new table, and a condition that a unique key column of the table is not null is added.

Figure 7:
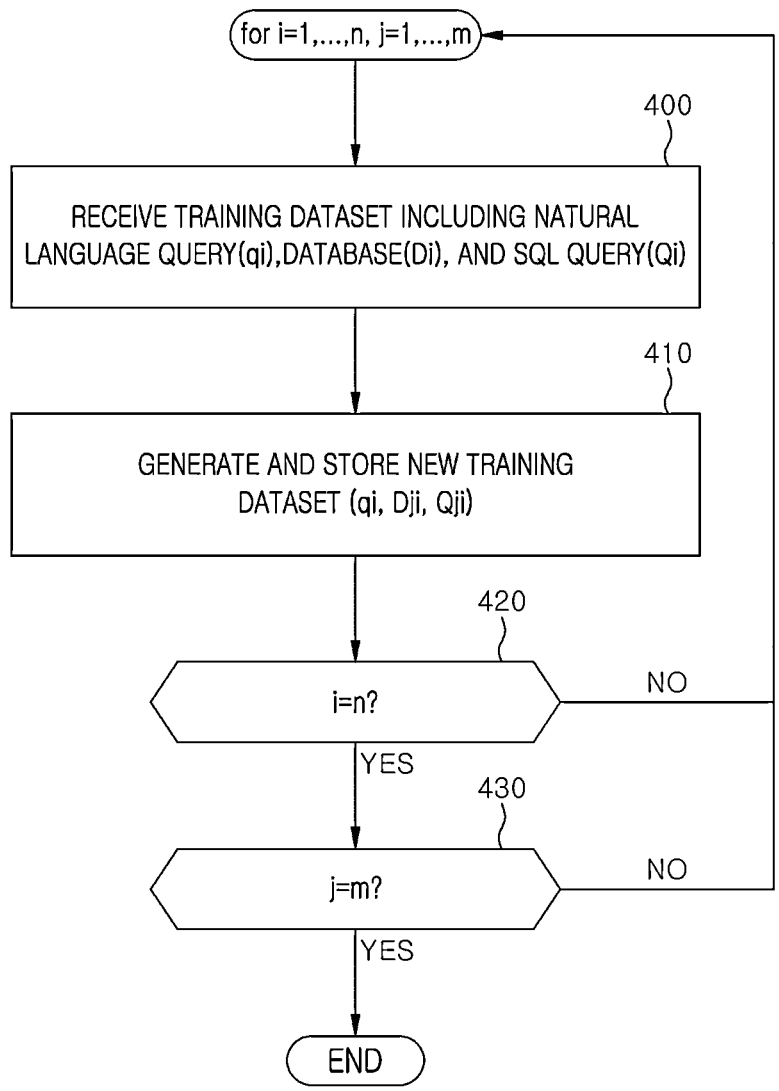
FIG. 7 is a flowchart illustrating an overall process in which multiple training dataset augmentation operations are consecutively performed according to an embodiment of the present disclosure.
Figure 8:
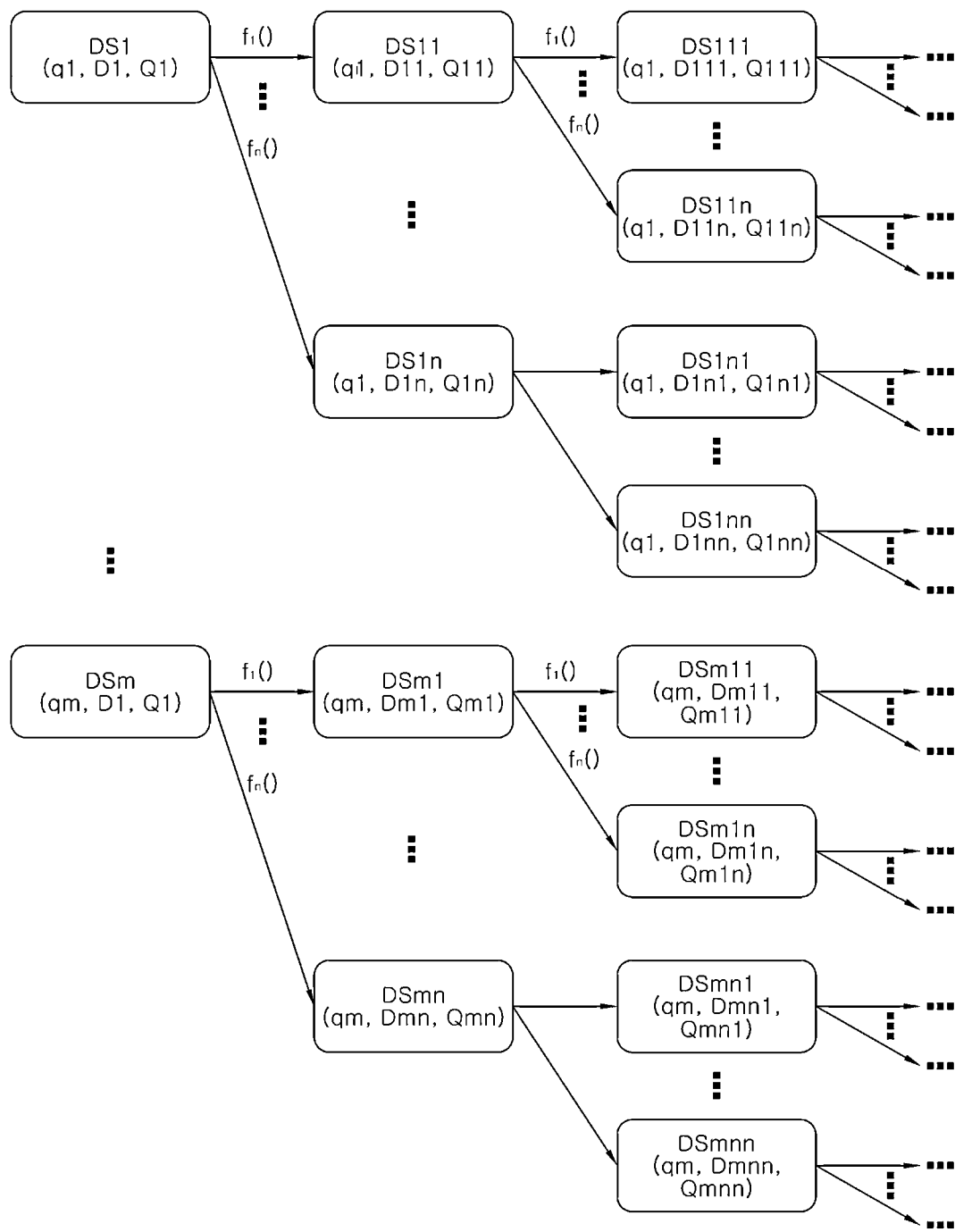
FIG. 8 is a diagram showing a data flow of a process in which multiple training dataset augmentation operations are consecutively performed according to an embodiment of the present disclosure.

FIG. 7 is a flowchart illustrating an overall process in which multiple training dataset augmentation operations are consecutively performed according to an embodiment of the present disclosure. FIG. 8 is a diagram showing a data flow of a process in which multiple training dataset augmentation operations are consecutively performed according to an embodiment of the present disclosure. Here, it is assumed that m initial training datasets $DS_j$ exist and n schema modification operations $f_i(\ )$ are applicable to each of the initial training datasets $DS_j$.

As described above with reference to FIGS. 3 and 4, the data augmentation engine 152 sequentially receives the initial training datasets $DS_j$ (operation 400). Each of the initial training datasets $DS_j$ may include a natural language query $q_j$, a database $D_j$, and an SQL query $Q_j$.

The data augmentation engine 152 may apply a first schema modification operation $f_1(\ )$ to a database $D_1$ in a first initial training dataset ($DS_1$: $q_1$, $D_1$, $Q_1$) and perform an SQL query synchronization operation corresponding to the first schema modification operation $f_1(\ )$ to generate and store a new training dataset ($DS_{11}$: $q_1$, $D_{11}$, $Q_{11}$) (operation 410).

Subsequently, the data augmentation engine 152 may apply a second schema modification operation $f_2(\ )$ to the database $D_1$ in the first initial training dataset ($DS_1$: $q_1$, $D_1$, $Q_1$) and perform an SQL query synchronization operation corresponding to the second schema modification operation $f_2(\ )$ to generate and store a new training dataset ($DS_{12}$: $q_1$, $D_{12}$, $Q_{12}$).

The data augmentation engine 152 performs a data augmentation operation by sequentially applying the n schema modification operations $f_i(\ )$ to the first initial training dataset ($DS_1$: $q_1$, $D_1$, $Q_1$). Finally, the data augmentation engine 152 may apply an $n^{th}$ schema modification operation $f_n(\ )$ to the database $D_1$ in the first initial training dataset ($DS_1$: $q_1$, $D_1$, $Q_1$) and perform an SQL query synchronization operation corresponding to the $n^{th}$ schema modification operation $f_n(\ )$ to generate and store a new training dataset ($DS_{1n}$: $q_1$, $D_{1n}$, $Q_{1n}$) (operation 420).

In this way, the data augmentation engine 152 may sequentially perform a data augmentation operation on the m initial training datasets. In other words, the data augmentation engine 152 may apply the first schema modification operation $f_1(\ )$ to an $m^{th}$ database $D_m$ in an $m^{th}$ initial training dataset ($DS_m$: $q_m$, $D_m$, $Q_m$) and perform an SQL query synchronization operation corresponding to the first schema modification operation $f_1(\ )$ to generate and store a new training dataset ($DS_{m1}$: $q_m$, $D_{m1}$, $Q_{m1}$) (operation 410).

The data augmentation engine 152 may perform a data augmentation operation by sequentially applying the n schema modification operations $f_i(\ )$ to the $m^{th}$ initial training dataset ($DS_m$: $q_m$, $D_m$, $Q_m$). Finally, the data augmentation engine 152 may apply the $n^{th}$ schema modification operation $f_n(\ )$ to the database $D_m$ in the $m^{th}$ initial training dataset ($DS_m$: $q_m$, $D_m$, $Q_m$) and perform an SQL query synchronization operation corresponding to the $n^{th}$ schema modification operation $f_n(\ )$ to generate and store a new training dataset ($DS_{mn}$: $q_m$, $D_{mn}$, $Q_{mn}$) (operation 430).

In this way, the data augmentation engine 152 may generate m×n new training datasets by sequentially applying the n schema modification operations $f_i(\ )$ to each of the m initial training datasets ($DS_j$). Also, the data augmentation engine 152 may additionally generate new training datasets by sequentially applying the n schema modification operations $f_i(\ )$ again to each of the m×n newly generated initial training datasets. The recursive training data augmentation operation illustrated in FIGS. 7 and 8 may continue until a predetermined termination condition is satisfied. The number of training datasets can be remarkably increased through this process.

FIG. 9 shows a pseudocode in which a training dataset augmentation process according to another exemplary embodiment of the present disclosure is summarized.

To efficiently augment training data through schema modification, a schema modification operation is performed only once for a database, and a process of correcting all SQL queries for the database at once may be performed. In this case, a database D, a set $Q_{SQL}$ of SQL queries existing in a training dataset, and a schema modification operation $f_D$ to be applied to the database D may be given as an input. An SQL synchronization operation $f_{sql}$ is calculated for the given schema modification operation $f_D$. A new database D' is calculated by applying the schema modification operation $f_D$ to the database D, and modified SQL queries may be obtained by performing the synchronization operation $f_{sql}$ on all the SQL queries belonging to the SQL query set $Q_{SQL}$.

The information search system shown in FIG. 1 may be implemented by a general-purpose data processing device including a processor and a memory. FIG. 10 shows an example of a physical configuration of an information search system according to an embodiment of the present disclosure. The information search system may include at least one processor 500, a memory 510, or a storage device 520. The components of the information search system may be connected through a bus to exchange data.

The processor 500 may execute program commands stored in the memory 510 and/or the storage device 520. The processor 500 may include at least one central processing unit (CPU), a graphics processing unit (GPU), or another processor for performing a method according to the present disclosure. The memory 510 may include a volatile memory, such as a random access memory (RAM), and a non-volatile memory such as a read-only memory (ROM). The memory 510 may load program commands stored in the storage device 520 and provide the program commands to the processor 500 so that the processor 500 may execute the program commands. The storage device 520 is a recording medium suitable for storing program commands and data and may be a magnetic medium, such as a hard disk, a floppy disk, or magnetic tape, an optical medium, such as a compact disk (CD)-ROM or a digital video disk (DVD), a magneto-optical medium, such as a floptical disk, or a semiconductor memory such as a flash memory, an erasable programmable ROM (EPROM), or a solid state drive (SSD) manufactured based on them.

When executed by the processor 500, the program commands may cause the processor 500 to perform operations required for implementing an information search method of the present disclosure, particularly, a neural network training dataset augmentation method. For example, when executed by the processor 500, the program commands may cause the processor 500 to perform an operation of training a predetermined neural network, an operation of receiving a natural language query, an operation of translating the natural language query into an SQL query based on the neural network, and an operation of acquiring a search result corresponding to the natural language query using the SQL query. Program commands that cause the processor 500 to perform the operation of training the neural network may cause the processor 500 to determine a first initial training dataset including a first training natural language query, database information of a database, and a first training SQL query corresponding to the first training natural language query, generate first new database information of a first new database having a different schema than the database by applying a first schema modification operation to the database, generate a first new training SQL query for the first new database by applying a first SQL query synchronization operation corresponding to the first schema modification operation to the first training SQL query, determine a first new training dataset including the first training natural language query, the first new database information, and the first new training SQL query, and train the neural network using the first new training dataset.

Although increasing the diversity of database schemas through a database schema modification operation and the resultant SQL query synchronization to augment training datasets has been mainly described above, augmentation of training datasets based on an increase in the number of natural language queries is not completely precluded.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

The invention claimed is:

1. A method of augmenting training datasets used for training a predetermined neural network in a natural language processing system, the natural language processing system including a translator for translating a natural language query into a structured query language (SQL) query based on the predetermined neural network, a data augmentation engine augmenting the training datasets for the translator, and a training engine training the translator using the augmented training datasets, the method comprising:

determining, with the data augmentation engine, a first initial training dataset including a first training natural language query, database information of a database, and a first training SQL query corresponding to the first training natural language query;

determining, with the data augmentation engine, a first schema modification operation from among predetermined schema modification operations;

generating, with the data augmentation engine, first new database information of a first new database having a different schema than the database by applying the first schema modification operation to the database;

determining, with the data augmentation engine, whether the first schema modification operation transforms the first training SQL query;

when the first schema modification operation is determined to transform the first training SQL query, generating, with the data augmentation engine, a first new training SQL query for the first new database by applying a first SQL query synchronization operation to the first training SQL query, the first SQL query synchronization operation being determined based on predetermined SQL query synchronization operation definition information corresponding to the first schema modification operation;

when the first schema modification operation is determined not to transform the first training SQL query, determining, with the data augmentation engine, the first training SQL query as the first new training SQL query for the first new database;

determining, with the data augmentation engine, a first new training dataset including the first training natural language query, the first new database information, and the generated or determined first new training SQL query; and providing, with the data augmentation engine, the first new training dataset as input to the training engine.

2. The method of claim 1, further comprising:

generating, with the data augmentation engine, second new database information of a second new database having a different schema than the database by applying a second schema modification operation, determined from among the predetermined schema modification operations, to the database;

generating, with the data augmentation engine, a second new training SQL query for the second new database by applying a second SQL query synchronization operation corresponding to the second schema modification operation to the first training SQL query; and determining, with the data augmentation engine, a second new training dataset including the first training natural language query, the second new database information, and the second new training SQL query.

3. The method of claim 2, further comprising:

determining, with the data augmentation engine, a second initial training dataset including a second training natural language query, the database information, and a second training SQL query corresponding to the second training natural language query;

generating, with the data augmentation engine, third new database information of a third new database having a different schema than the database by applying the first schema modification operation to the database;

generating, with the data augmentation engine, a third new training SQL query for the third new database by applying the first SQL query synchronization operation to the second training SQL query; and determining, with the data augmentation engine, a third new training dataset including the second training natural language query, the third new database information, and the third new training SQL query.

4. The method of claim 3, further comprising:
generating, with the data augmentation engine, fourth new database information of a fourth new database having a different schema than the first new database by applying the first schema modification operation to the first new database;
generating, with the data augmentation engine, a fourth new training SQL query for the fourth new database by applying the first SQL query synchronization operation to the first new training SQL query; and
determining, with the data augmentation engine, a fourth new training dataset including the first training natural language query, the fourth new database information, and the fourth new training SQL query.

5. The method of claim 1, further comprising:
determining, with the data augmentation engine, a second initial training dataset including a second training natural language query, the database information, and a second training SQL query corresponding to the second training natural language query;
generating, with the data augmentation engine, second new database information of a second new database having a different schema than the database by applying the first schema modification operation to the database;
generating, with the data augmentation engine, a second new training SQL query for the second new database by applying the first SQL query synchronization operation corresponding to the first schema modification operation to the second training SQL query; and
determining, with the data augmentation engine, a second new training dataset including the second training natural language query, the second new database information, and the second new training SQL query.

6. The method of claim 1, wherein the first schema modification operation includes at least one of a first modification operation of changing a schema structure of the database or a second modification operation of changing a name of a schema element of the database.

7. A method of training a predetermined neural network in a natural language processing system, the natural language processing system including a translator for translating a natural language query into a structured query language (SQL) query based on the predetermined neural network, a data augmentation engine augmenting training datasets for the translator, and a training engine training the translator using the augmented training datasets, the method comprising:
determining, with the data augmentation engine, a first initial training dataset including a first training natural language query, database information of a database, and a first training SQL query corresponding to the first training natural language query;
determining, with the data augmentation engine, a first schema modification operation from among predetermined schema modification operations;
generating, with the data augmentation engine, first new database information of a first new database having a different schema than the database by applying the first schema modification operation to the database;
determining, with the data augmentation engine, whether the first schema modification operation transforms the first training SQL query;
when the first schema modification operation is determined to transform the first training SQL query, generating, with the data augmentation engine, a first new training SQL query for the first new database by applying a first SQL query synchronization operation to the first training SQL query, the first SQL query synchronization operation being determined based on predetermined SQL query synchronization operation definition information corresponding to the first schema modification operation;
when the first schema modification operation is determined not to transform the first training SQL query, determining, with the data augmentation engine, the first training SQL query as the first new training SQL query for the first new database;
determining, with the data augmentation engine, a first new training dataset including the first training natural language query, the first new database information, and the generated or determined first new training SQL query;
training, with the training engine, the neural network using the first new training dataset received from the data augmentation engine to optimize parameters of the translator; and
providing, with the training engine, the parameters output by the trained neural network and translation reference data generated during training of the neural network for reference in translation to the translator.

8. The method of claim 7, further comprising:
generating, with the data augmentation engine, second new database information of a second new database having a different schema than the database by applying a second schema modification operation, determined from among the predetermined schema modification operations, to the database;
generating, with the data augmentation engine, a second new training SQL query for the second new database by applying a second SQL query synchronization operation corresponding to the second schema modification operation to the first training SQL query; and
determining, with the data augmentation engine, a second new training dataset including the first training natural language query, the second new database information, and the second new training SQL query,
wherein the training of the neural network is performed using the first and second new training datasets.

9. The method of claim 8, further comprising:
determining, with the data augmentation engine, a second initial training dataset including a second training natural language query, the database information, and a second training SQL query corresponding to the second training natural language query;
generating, with the data augmentation engine, third new database information of a third new database having a different schema than the database by applying the first schema modification operation to the database;
generating, with the data augmentation engine, a third new training SQL query for the third new database by applying the first SQL query synchronization operation to the second training SQL query; and
determining, with the data augmentation engine, a third new training dataset including the second training natural language query, the third new database information, and the third new training SQL query,
wherein the training of the neural network is performed using the first to third new training datasets.

10. The method of claim 9, further comprising:
generating, with the data augmentation engine, fourth new database information of a fourth new database having a different schema than the first new database by applying the first schema modification operation to the first new database;
generating, with the data augmentation engine, a fourth new training SQL query for the fourth new database by applying the first SQL query synchronization operation to the first new training SQL query; and
determining, with the data augmentation engine, a fourth new training dataset including the first training natural language query, the fourth new database information, and the fourth new training SQL query,
wherein the training of the neural network is performed using the first to fourth new training datasets.

11. The method of claim 7, further comprising:
determining, with the data augmentation engine, a second initial training dataset including a second training natural language query, the database information, and a second training SQL query corresponding to the second training natural language query;
generating, with the data augmentation engine, second new database information of a second new database having a different schema than the database by applying the first schema modification operation to the database;
generating, with the data augmentation engine, a second new training SQL query for the second new database by applying the first SQL query synchronization operation corresponding to the first schema modification operation to the second training SQL query; and
determining, with the data augmentation engine, a second new training dataset including the second training natural language query, the second new database information, and the second new training SQL query,
wherein the training of the neural network is performed using the first and second new training datasets.

12. The method of claim 7, wherein the first schema modification operation includes at least one of a first modification operation of changing a schema structure of the database or a second modification operation of changing a name of a schema element of the database.

13. An information search device for providing a search result corresponding to a natural language query, the information search device comprising:
a memory configured to store program commands; and
a processor connected to the memory and configured to execute the program commands stored in the memory,
wherein, when the program commands are executed by the processor, the program commands cause the processor to perform the operations of:
training, with a training engine, a predetermined neural network;
receiving the natural language query from a user;
translating, with a translator, the natural language query into a structured query language (SQL) query based on the predetermined neural network;
acquiring, with a relational database management system, the search result corresponding to the natural language query using the SQL query; and
providing the search result to the user,
wherein the program commands causing the processor to perform the operation of training the predetermined neural network cause the processor to perform the operations of:
determining, with the data augmentation engine, a first initial training dataset including a first training natural language query, database information of a database, and a first training SQL query corresponding to the first training natural language query;
determining, with the data augmentation engine, a first schema modification operation from among predetermined schema modification operations;
generating, with the data augmentation engine, first new database information of a first new database having a different schema than the database by applying the first schema modification operation to the database;
determining, with the data augmentation engine, whether the first schema modification operation transforms the first training SQL query;
when the first schema modification operation is determined to transform the first training SQL query, generating, with the data augmentation engine, a first new training SQL query for the first new database by applying a first SQL query synchronization operation to the first training SQL query, the first SQL query synchronization operation being determined based on predetermined SQL query synchronization operation definition information corresponding to the first schema modification operation;
when the first schema modification operation is determined not to transform the first training SQL query, determining, with the data augmentation engine, the first training SQL query as the first new training SQL query for the first new database;
determining, with the data augmentation engine, a first new training dataset including the first training natural language query, the first new database information, and the generated or determined first new training SQL query;
training, with the training engine, the neural network using the first new training dataset received from the data augmentation engine to optimize parameters of the translator;
providing, with the training engine, the parameters output by the trained neural network and translation reference data generated during training of the neural network for reference in translation to the translator; and
wherein the program commands, when executed by the processor, further cause the processor, when translating, with the translator, the natural language query into the structured query language (SQL) query based on the predetermined neural network, to translate the natural language query into the SQL query using the parameters and the translation reference data.

14. The information search device of claim 13, wherein the program commands causing the processor to perform the operation of training the neural network cause the processor to further perform the operations of:
generating, with the data augmentation engine, second new database information of a second new database having a different schema than the database by applying a second schema modification operation, determined from among the predetermined schema modification operations, to the database;
generating, with the data augmentation engine, a second new training SQL query for the second new database by applying a second SQL query synchronization operation corresponding to the second schema modification operation to the first training SQL query; and
determining, with the data augmentation engine, a second new training dataset including the first training natural language query, the second new database information, and the second new training SQL query, wherein the training of the neural network is performed using the first and second new training datasets.

15. The information search device of claim 14, wherein the program commands causing the processor to perform the operation of training the neural network cause the processor to further perform the operations of:

determining, with the data augmentation engine, a second initial training dataset including a second training natural language query, the database information, and a second training SQL query corresponding to the second training natural language query;

generating, with the data augmentation engine, third new database information of a third new database having a different schema than the database by applying the first schema modification operation to the database;

generating, with the data augmentation engine, a third new training SQL query for the third new database by applying the first SQL query synchronization operation to the second training SQL query; and determining, with the data augmentation engine, a third new training dataset including the second training natural language query, the third new database information, and the third new training SQL query, wherein the training of the neural network is performed using the first to third new training datasets.

16. The information search device of claim 14, wherein the program commands causing the processor to perform the operation of training the neural network cause the processor to further perform the operations of:

generating, with the data augmentation engine, fourth new database information of a fourth new database having a different schema than the first new database by applying the first schema modification operation to the first new database;

generating, with the data augmentation engine, a fourth new training SQL query for the fourth new database by applying the first SQL query synchronization operation to the first new training SQL query; and determining, with the data augmentation engine, a fourth new training dataset including the first training natural language query, the fourth new database information, and the fourth new training SQL query, wherein the training of the neural network is performed using the first to fourth new training datasets.

17. The information search device of claim 13, wherein the program commands causing the processor to perform the operation of training the neural network cause the processor to further perform the operations of:

determining, with the data augmentation engine, a second initial training dataset including a second training natural language query, the database information, and a second training SQL query corresponding to the second training natural language query;

generating, with the data augmentation engine, second new database information of a second new database having a different schema than the database by applying the first schema modification operation to the database;

generating, with the data augmentation engine, a second new training SQL query for the second new database by applying the first SQL query synchronization operation corresponding to the first schema modification operation to the second training SQL query; and determining, with the data augmentation engine, a second new training dataset including the second training natural language query, the second new database information, and the second new training SQL query, wherein the training of the neural network is performed using the first and second new training datasets.

18. The information search device of claim 13, wherein the first schema modification operation includes at least one of a first modification operation of changing a schema structure of the database or a second modification operation of changing a name of a schema element of the database, and when the first schema modification operation only includes the first modification operation, the first SQL query synchronization operation is a null operation.

\* \* \* \* \*